United States Patent
Pettersson et al.

(10) Patent No.: US 9,592,821 B2
(45) Date of Patent: Mar. 14, 2017

(54) DRIVE SYSTEM FOR HYBRID VEHICLE WITH MEANS FOR CALCULATING ENGINE TORQUE BASED ON MOTOR TORQUE

(71) Applicant: SCANIA CV AB, Södertälje (SE)

(72) Inventors: Niklas Pettersson, Stockholm (SE); Mikael Bergquist, Hägersten (SE); Karl Redbrandt, Solna (SE); Mathias Björkman, Tullinge (SE); Johan Lindstrom, Nyköping (SE)

(73) Assignee: SCANIA CV AB (SE)

( * ) Notice: Subject to any disclaimer, the term of this patent is extended or adjusted under 35 U.S.C. 154(b) by 77 days.

(21) Appl. No.: 14/410,643

(22) PCT Filed: Jun. 26, 2013

(86) PCT No.: PCT/SE2013/050785
§ 371 (c)(1),
(2) Date: Dec. 23, 2014

(87) PCT Pub. No.: WO2014/003666
PCT Pub. Date: Jan. 3, 2014

(65) Prior Publication Data
US 2015/0191163 A1    Jul. 9, 2015

(30) Foreign Application Priority Data

Jun. 27, 2012   (SE) .................. 1250718-2

(51) Int. Cl.
*B60W 20/00* (2016.01)
*B60K 6/365* (2007.10)
(Continued)

(52) U.S. Cl.
CPC ............ *B60W 20/10* (2013.01); *B60K 6/365* (2013.01); *B60K 6/48* (2013.01); *B60W 10/06* (2013.01);
(Continued)

(58) Field of Classification Search
USPC ........................................... 701/22
See application file for complete search history.

(56) References Cited

U.S. PATENT DOCUMENTS 9,172,738 B1 * 10/2015 Dacosta ............... H04L 67/00
2004/0249525 A1  12/2004 Okoshi et al.
(Continued)

FOREIGN PATENT DOCUMENTS

| EP | 1 316 460 A1 | 6/2003 |
| JP | 2010-019136 | 1/2010 |
| SE | 1051384-4 | 6/2012 |

OTHER PUBLICATIONS

International Search Report dated Oct. 17, 2013 issued in corresponding International patent application No. PCT/SE2013/050785.
(Continued)

*Primary Examiner* — Michael McCullough
*Assistant Examiner* — Michael E Butler
(74) *Attorney, Agent, or Firm* — Ostrolenk Faber LLP

(57) ABSTRACT

A drive system and a method of driving a vehicle (1). The drive system includes (1) a combustion engine (2), a gear box (3), an electric machine (9), and a planetary gear. A control unit (18) has access to information concerning the moment ($T_{el}$) of the electric machine (9) for driving the vehicle (1) and to calculate the moment ($T_{1c}$) of the combustion engine (2) for driving the vehicle (1) at at least a first operation occasion ($D_1$) when there is a known relation between the moment ($T_{el}$) of the electric machine and the moment ($T_{1c}$) of the combustion engine.

18 Claims, 2 Drawing Sheets

Figure 1:
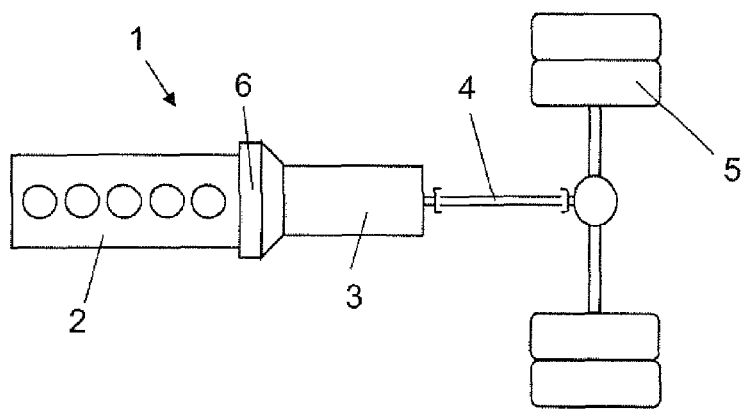

(51) Int. Cl.
*B60W 10/06* (2006.01)
*B60K 6/48* (2007.10)
*F02D 29/02* (2006.01)
*B60W 50/00* (2006.01)

(52) U.S. Cl.
CPC ........ *B60W 20/50* (2013.01); *B60W 50/0098* (2013.01); *F02D 29/02* (2013.01); *B60W 2050/0088* (2013.01); *B60W 2510/0657* (2013.01); *B60W 2510/083* (2013.01); *B60Y 2200/92* (2013.01); *B60Y 2300/18025* (2013.01); *Y02T 10/6221* (2013.01); *Y10S 903/905* (2013.01)

(56) References Cited

U.S. PATENT DOCUMENTS

| | | | | |
|---|---|---|---|---|
| 2006/0021811 A1* | 2/2006 | Kuang | ................... | B60K 6/365 180/65.25 |
| 2006/0022469 A1 | 2/2006 | Syed et al. | | |
| 2009/0037061 A1* | 2/2009 | Tabata | ................... | B60K 6/445 701/55 |
| 2010/0203995 A1* | 8/2010 | Zhang | ................... | B60K 6/365 475/5 |
| 2012/0053010 A1* | 3/2012 | Kuang | ................... | B60K 6/445 477/3 |
| 2016/0311439 A1* | 10/2016 | Yamamoto | ............ | B60W 30/20 |

OTHER PUBLICATIONS

International Preliminary Report on Patentability dated Sep. 25, 2014 issued in corresponding International patent application No. PCT/SE2013/050785.

* cited by examiner

DRIVE SYSTEM FOR HYBRID VEHICLE WITH MEANS FOR CALCULATING ENGINE TORQUE BASED ON MOTOR TORQUE

CROSS-REFERENCE TO RELATED APPLICATIONS

The present application is a 35 U.S.C. §§371 National Phase conversion of PCT/SE2013/050785, filed Jun. 26, 2013, which claims priority of Swedish Patent Application No. 1250718-2, filed Jun. 27, 2012, the contents of which are incorporated by reference herein. The PCT International Application was published in the English language.

BACKGROUND OF THE INVENTION AND PRIOR ART

The present invention concerns a drive system and a method of driving a vehicle using the system.

To use a conventional clutch mechanism which disconnects the input shaft of the gear box from the combustion engine during gear changing processes in the gear box involves disadvantages. When a stationary vehicle starts, the discs of the clutch mechanism slide against each other, thereby heating the discs. This heating results in increased fuel consumption and wear of the clutch discs. A conventional clutch mechanism is also relatively heavy and expensive. It occupies also a relatively large space in the vehicle. To use a hydraulic moment converter also results in losses.

Hybrid vehicles can be driven by a primary motor which can be a combustion engine and a secondary motor which can be an electric machine. The electric machine is equipped with at least one energy storage for storing electric energy and control equipment for controlling the flow of electric energy between the energy storage and the electric machine. The electric machine can thereby alternately work as a motor or a generator in dependence on the operation state of the vehicle. When the vehicle is braked, the electric machine generates electric energy which is stored in the energy storage. The stored electric energy is used later, for example, for driving the vehicle and operating different auxiliary systems in the vehicle.

Swedish patent application SE 1051384-4, which has not been made public, shows a hybrid drive system with a planetary gear which comprises three components, namely a sun wheel, a planet wheel holder and a ring wheel. One of the three components of the planetary gear is connected to an output shaft of the combustion engine, a second component of the planetary gear is connected to an input shaft to the gear box and a third component of the planetary gear is connected to a rotor of an electric machine. The electric machine is connected to an energy storage such that it alternately can work as a motor or a generator. The rotation speed of electric machines can be controlled in a stepless manner. By controlling the rotation speed of the electric machine, the input shaft to the gear box can be given a desired rotation speed. With a hybrid system according to SE 1051384-4 no clutch mechanism needs to be used in the drive line of the vehicle.

The moment of the combustion engine and the moment of the electric machine provide together the driving moment of the vehicle. The combustion engine is however often used for the operation of different assemblies in the vehicle. There is also an uncertainty concerning the design of components included in the combustion engine, wear aging, etc. The quality of the fuel, the temperature of the fuel and the temperature of the combustion engine are other factors which make it difficult to determine the moment which the combustion engine supplies for the operation and thereby the driving moment of the vehicle. It is however important that the combustion engine provides a demanded moment with a high accuracy at certain operation states, for example, when gears are shifted and when disengaging the planetary gear.

SUMMARY OF THE INVENTION

The object of the present invention is to provide a drive system for a vehicle of the initially mentioned kind, where the moment of the combustion engine for driving the vehicle can be determined with a high accuracy.

This object is achieved with a drive system disclosed herein. When driving a vehicle, a moment for driving the vehicle is demanded with an accelerator pedal by a driver. The control unit demands the moment which the electric machine is to deliver and the moment which the combustion engine is to deliver such that the vehicle obtains the moment demanded by the driver. The control unit can control a suitable control mechanism which leads electric energy to and from the electric machine such that it delivers the determined moment for driving the vehicle. The control mechanism can lead current to and from the electric machine with a phase and an amplitude such that the electric machine supplies the demanded moment. The phase and amplitude of the supplied current may also, when needed, be measured in order to ensure that the electric machine delivers the demanded moment. The moment which the electric machine delivers for driving the vehicle can in most cases be determined with a very high accuracy.

In a planetary gear there is a correlation between the moment of the included components which is defined by the number of cogs of the respective components. Since the electric machine and the combustion engine are each connected to one component of the planetary gear, it is possible to calculate the moment of the combustion engine with knowledge of the moment of the electric machine. With the help of the calculated moment of the combustion engine, a more accurate determination is achieved of the supplied moment of the combustion engine than if the supplied moment of the combustion engine is only based on more conventional information, such as injected fuel amount, etc. Such an accurate determination of the supplied moment of the combustion engine can be used in many contexts.

According to an embodiment of the present invention, the control unit compares the calculated moment of the combustion engine with the demanded moment of the combustion engine at a first operation occasion. The calculated moment of the combustion engine thus gives a more reliable information of the supplied moment of the combustion engine than the demanded moment of the combustion engine. The combustion engine thus does not always provide the demanded moment with high accuracy. By comparing the calculated moment of the combustion engine with the demanded moment of the combustion engine, a possible deviation between the supplied moment of the combustion engine and the demanded moment of the combustion engine can be determined.

According to an embodiment of the present invention, the control unit stores information concerning the deviation between the calculated moment of the combustion engine and the demanded moment of the combustion engine at said first operation occasion and uses this stored information for controlling the combustion engine at second operation occasions. In this case, information is stored about a possible deviation between the calculated moment of the combustion engine and the demanded moment of the combustion engine. With knowledge about such a possible deviation, the combustion engine can from then on be controlled in a manner such that the deviation is eliminated or at least clearly reduced. The control unit may adjust the amount of injected fuel such that the deviation is eliminated.

According to an embodiment of the present invention, the control unit stores information concerning the deviation between the calculated moment of the combustion engine and the demanded moment of the combustion engine at different operation states of the combustion engine. The deviation which is the case between the demanded moment of the combustion engine and the supplied moment of the combustion engine varies with a high probability at different operation states. The deviation may vary with operation parameters, such as the rotation speed and moment of the combustion engine. It is therefore suitable to store information which informs about how the deviation varies with different operation parameters. With the help of such information, the supplied moment of the combustion engine can be determined with a high accuracy at substantially all operation states of the combustion engine.

According to an embodiment of the invention, the control unit supplements and/or updates said stored information concerning the deviation between the calculated moment of the combustion engine and the demanded moment of the combustion engine during subsequent first operation occasions. A reason that the combustion engine does not deliver the demanded moment with a desired accuracy is often that it also operates several auxiliary assemblies in the vehicle in the form of a cooling liquid pump, a radiator fan, a compressor of an AC-equipment, etc. When the combustion engine's operation of the auxiliary assemblies varies with, for example, time and the surrounding temperature, it is suitable to relatively frequently supplement and/or update the stored information concerning the deviation between the calculated moment of the combustion engine and the demanded moment of the combustion engine. Other reasons as to why the combustion engine does not deliver the demanded moment may depend on factors which are related to the components which supply the fuel, the quality and temperature of the fuel.

According to an embodiment of the invention, the control unit uses the calculated moment of the combustion engine for controlling the combustion engine at second operation occasions when it is required that the combustion engine supplies the demanded moment with high accuracy. At certain operation occasions it is in particular important that the combustion engine supplies a demanded moment with high accuracy. Such an operation occasion is when a gear is to be disengaged from the gear box. In order to do this, a momentless state must be created in the gear box. With knowledge about the supplied moment of the combustion engine with high accuracy, the disengagement process of a gear can take place quicker and with better accuracy.

According to an embodiment of the invention, the planetary gear comprises a coupling member with which it is possible to lock the output shaft of the combustion engine and the input shaft of the gear box in relation to each other and that the control unit is adapted to determine the calculated moment of the combustion engine at first operation occasions when the coupling member is in a non-locked position in which said shafts are rotatable with different rotation speeds. It is in practice possible to calculate the moment of the combustion engine at all operation occasions when the coupling member is in the non-locked position. It is however an advantage to calculate the moment of the combustion engine at certain operation occasions of the vehicle when the moment of the combustion engine can be calculated with a considerable spread in rotation speed and moment. Such operation occasions may be when the vehicle starts with a free planetary gear, when gears are shifted in the vehicle and when the vehicle is driven with relatively small moments at the same time as the combustion engine is running idle.

According to an embodiment of the invention, the control unit calculates the moment which the combustion engine supplies for driving the vehicle with the help of parameters such as the transmission ratio between the output shaft of the combustion engine and the electric machine in the planetary gear, the moment of inertia of the electric machine, the acceleration of the electric machine, the moment of inertia of the combustion engine, and the acceleration of the combustion engine. At operation occasions when the output shaft of the combustion engine and the electric machine rotate with constant rotation speeds, a moment distribution is obtained between the combustion engine, and the electric machine which is defined by the transmission ratio between said components in the planetary gear. At operation occasions when the electric machine changes rotation speeds, account has to be taken of the change in rotation speed (acceleration) and the moment of inertia of the electric machine in order to be able to calculate the moment of the combustion engine. The moment of inertia of the electric machine is a known parameter. The electric rotation speed change may be determined by the difference in rotation speed at two points in time. At operation occasions when the combustion engine changes rotation speed, account must be taken in a corresponding manner to the change in rotation speed (acceleration) and the moment of inertia of the combustion engine in order to be able to calculate the moment of the combustion engine. The moment of inertia of the combustion engine is a known parameter. The change in rotation speed of the combustion engine can be determined by a difference in rotation speed at two points in time. It is thus relatively simple to calculate the moment of the combustion engine since the other parameters relatively easily can be determined or estimated with a high accuracy.

According to another preferred embodiment of the invention, the output shaft of the combustion engine is connected to the sun wheel of the planetary gear, the input shaft of the gear box is connected to the planet wheel holder of the planetary gear and the rotor of the electric machine is connected to the ring wheel of the planetary gear. With such a design, the included components may be given a compact construction. The sun wheel and the planet wheel holder may be connected to the output shaft of the combustion engine and the input shaft of the gear box, respectively, with the help of spline joints or the like. It is thereby guaranteed that the sun wheel rotates with the same rotation speed as the output shaft of the combustion engine and that the planet wheel holder rotates with the same rotation speed as the input shaft of the gear box. The rotor of the electric machine may be fixedly arranged on an external peripheral surface of the ring wheel. The internal peripheral surface of the ring wheel is normally provided with cogs. The external peripheral surface of the ring wheel is normally smooth and very well suited for carrying the rotor of the electric machine. The ring wheel and the rotor of the electric machine thereby form a rotatable unit. Alternatively, the rotor of the electric machine may be connected to the ring wheel via a transmission. It is however possible to connect the output shaft of the combustion engine, the input shaft of the gear box and the rotor of the electric machine with any of the other components of the planetary gear.

The initially mentioned object is achieved also by performing the method disclosed herein.

SHORT DESCRIPTION OF THE DRAWINGS

Figure 2:
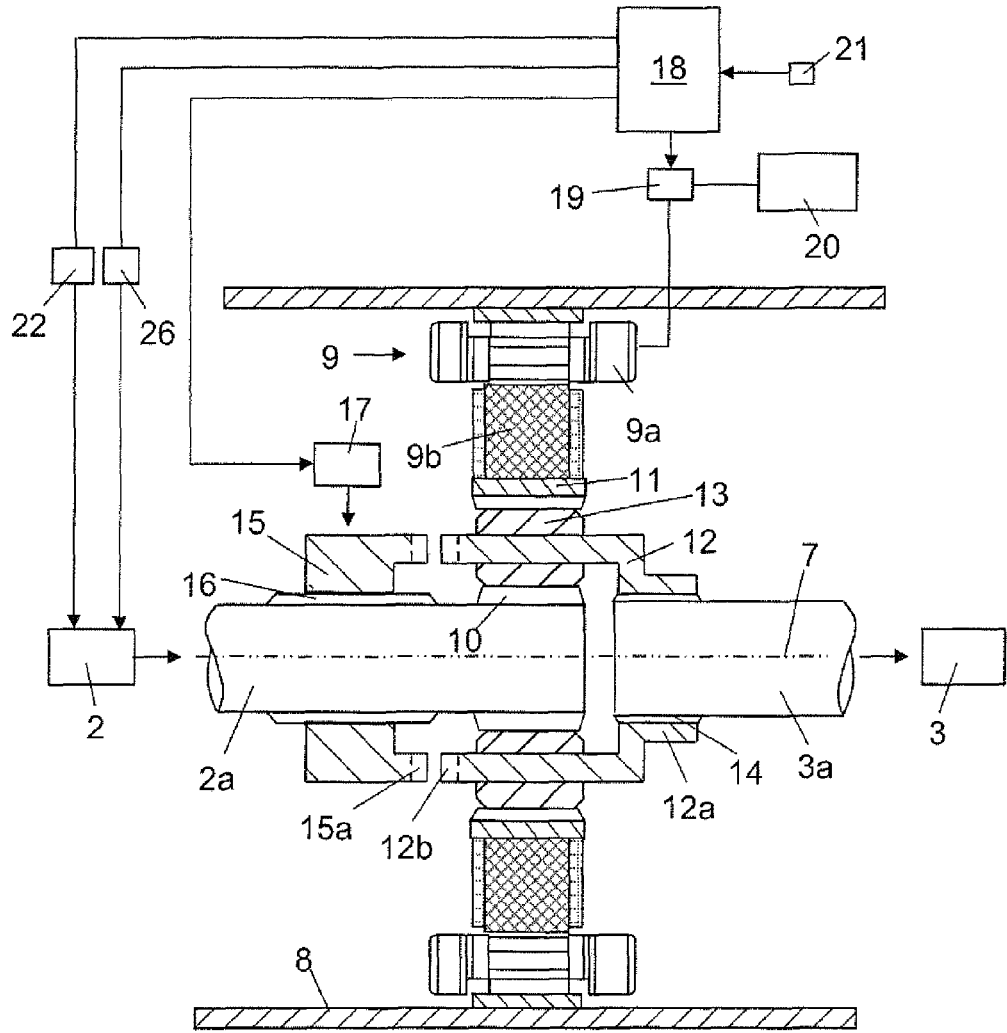
Figure 3:
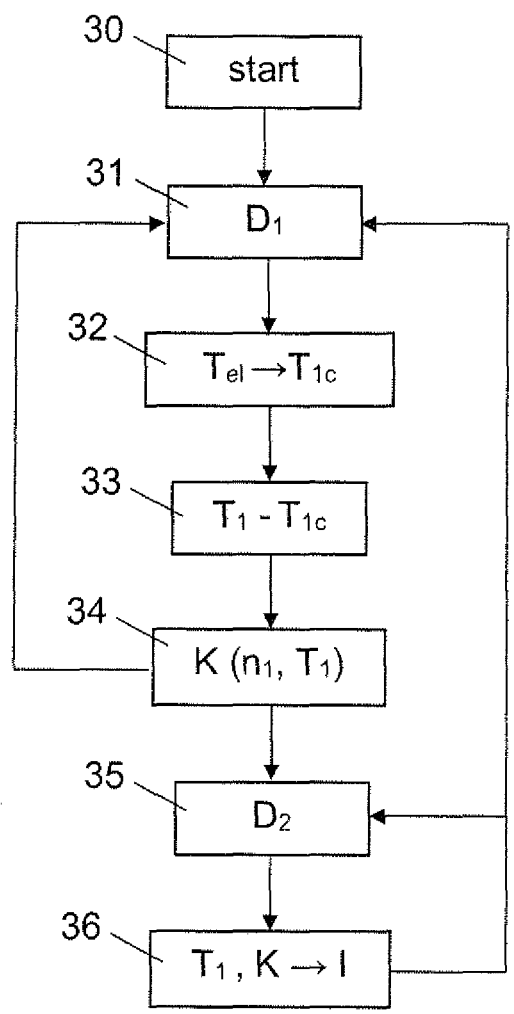

In the following preferred embodiments of the invention are described, as examples, with reference to the annexed drawings, on which:

FIG. 1 shows a drive line of a vehicle with a drive system according to the present invention, FIG. 2 shows the drive system in more detail and FIG. 3 shows a flow chart which shows an embodiment of a method according to the invention.

DETAILED DESCRIPTION OF EMBODIMENTS OF THE INVENTION

FIG. 1 shows a drive line for a heavy vehicle 1. The drive line comprises a combustion engine 2, a gear box 3, a number of drive shafts 4 and drive wheels 5. Between the combustion engine 2 and the gear box 3 the drive line comprises an intermediate part 6. FIG. 2 shows the components in the intermediate part 6 in more detail. The combustion engine 2 is provided with an output shaft 2a and the gear box 3 with an input shaft 3a in the intermediate part 6. The output shaft 2a of the combustion engine is coaxially arranged in relation to the input shaft 3a of the gear box. The output shaft 2a of the combustion engine and the input shaft 3a of the gear box are rotatably arranged around a common axis of rotation 7. The intermediate part 6 comprises a housing 8 which encloses an electric machine 9 and a planetary gear. The electric machine 9 comprises in a customary manner a stator 9a and a rotor 9b. The stator 9a comprises a stator core which is attached in a suitable manner on the inside of the housing 8. The stator core comprises the windings of the stator. The electric machine 9 is adapted to during certain operation states use stored electric energy for supplying drive power to the input shaft 3a of the gear box and to during other operation states use the kinetic energy of the input shaft 3 of the gear box for extracting and storing electric energy.

The planetary gear is arranged substantially radially inside of the stator 9a and rotor 9b of the electric machine. The planetary gear comprises in a customary manner a sun wheel 10, a ring wheel 11 and a planet wheel holder 12. The planet wheel holder 12 carries a number of cog wheels 13 which are rotatably arranged in a radial space between the cogs of the sun wheel 10 and the ring wheel 11. The sun wheel 10 is attached on a peripheral surface of the output shaft 2a of the combustion engine. The sun wheel 10 and the output shaft 2a of the combustion engine rotate as a unit with a first rotation speed $n_1$. The planet wheel holder 12 comprises an attachment portion 12a which is attached on a peripheral surface of the input shaft 3a of the gear box with the help of a spline joint 14. With the help of this joint, the planet wheel holder 12 and the input shaft 3a of the gear box can rotate as a unit with a second rotation speed $n_2$.

The ring wheel 11 comprises an external peripheral surface on which the rotor 9b is fixedly mounted. The rotor 9b and the ring wheel 11 constitute a rotatable unit which rotates with a third rotation speed $n_3$.

Since the intermediate part 6 between the combustion engine 2 and the gear box 3 in a vehicle is limited, it is required that the electric machine 9 and the planetary gear constitute a compact unit. The components 10-12 of the planetary gear are here arranged substantially radially inside of the stator 9a of the electric machine. The rotor 9b of the electric machine, the ring wheel 11 of the planetary gear, the output shaft 2a of the combustion engine and the input shaft 3a of the gear box are here rotatably arranged around a common axis of rotation 5. With such a design, the electric machine 9 and the planetary gear occupy a relatively small space.

The vehicle comprises a locking mechanism which is movable between a first open position in which the three components 10-12 of the planetary gear are allowed to rotate with different rotation speeds, and a second locked position, in which it locks together two of the components 10, 12 of the planetary gear such that the three components 10-12 of the planetary gear rotate with the same rotation speed. In this embodiment, the locking mechanism comprises a displaceable coupling member 15. The coupling member 15 is attached on the output shaft 2a of the combustion engine with the help of a spline joint 16. The coupling member 15 is in this case arranged, secured against turning on axis 7, on the output shaft 2a of the combustion engine and is displaceably arranged in an axial direction on the output shaft 2a of the combustion engine. The coupling member 15 comprises a coupling portion 15a which is connectable to a coupling portion 12b of the planet wheel holder 12. The locking mechanism comprises a schematically shown displacement member 17 which displaces the coupling member 15 between the first free position $I_1$ when the coupling portions 15a, 12b are not in engagement with each other and the second locked position $I_2$ when the coupling portions 15a, 12b are in engagement with each other. In the first open position, the output shaft 2 of the combustion engine and the input shaft 3 of the gear box can rotate with different rotation speeds. When the coupling portions 15a, 12b are in engagement with each other, the output shaft 2 of the combustion engine and the input shaft 3 of the gear box will rotate with the same rotation speed.

An electric control unit 18 controls the displacement member 17. The control unit 18 is also decides at which operation occasions the electric machine 9 is to work as a motor and at which operation occasions it is to work as a generator. In order to decide this, the control unit 18 can receive actual information from suitable operation parameters. The control unit 18 can be a computer with suitable software for this purpose. The control unit 18 can be one or more separate units. The control unit 18 also controls a schematically shown control equipment 19 which controls the flow of electric energy between a hybrid battery 20 and the stator 9a of the electric machine. At operation occasions when the electric machine 9 works as a motor, stored electric energy from the hybrid battery 20 is supplied to the stator 9a. At operation occasions when the electric machine works as a generator, electric energy from the stator 9a is supplied to the hybrid battery 20. The hybrid battery 20 delivers and stores electric energy with a rated voltage which is on the order of 200-800 Volt. The vehicle 1 is equipped with a motor control function 26 with which the moment $T_1$ and rotation speed $n_1$ of the combustion engine can be controlled. The control unit 18 has, for example, the possibility to activate the motor control function 26 when gears are engaged and disengaged in the gear box 3 in order to create a momentless state in the gear box 3.

During the operation of the vehicle 1, a moment is demanded for driving the vehicle 1 by a driver via a schematically shown accelerator pedal 21. The control unit 18 determines the moment $T_3$ which the electric machine 9 is to deliver and the moment $T_1$ which the combustion engine is to deliver in order for the vehicle to be driven with the demanded moment T. The control unit 18 controls the control mechanism 19 such that it leads current from the hybrid battery 20 to the electric machine 9 with an amplitude and a phase such that the electric machine 9 obtains the demanded moment $T_3$. The moment $T_3$ which the electric machine 9 delivers for driving the vehicle 1 is supplied or received with high accuracy. The control unit 18 controls schematically shown injection members 22 in the combustion engine 2 such that fuel is injected in an amount which corresponds to the demanded moment $T_1$. The combustion engine 2 is however often used for the operation of different assemblies in the vehicle 1. It is, inter alia, for this reason that the combustion engine 2 does not always supply the demanded moment $T_1$, with a desired accuracy. Other such reasons are related to the components of the combustion engine which supply the fuel, the quality and temperature of the fuel.

In a planetary gear there is a correlation between the moments of the sun wheel 10, the ring wheel 11 and the planet holder 12 which is defined by the number of cogs of the respective components 10-12. Since the electric machine 9 and the combustion engine 2 are each connected to one component 10, 12 of the planetary gear, it is possible to calculate the moment $T_{1c}$ of the combustion engine 2 with knowledge about the estimated moment $T_3$ of the electric machine. Since the supplied moment $T_3$ of the electric machine 9 can be determined with high accuracy, the calculated moment $T_{1c}$ of the combustion engine 2 corresponds to the real supplied moment of the combustion engine with high accuracy.

The moment $T_{1c}$ of the combustion engine 2 can be calculated according to the correlation $$i(-J_3 dw_3/dt + T_3) = (-J_1 dw_1/dt + T_{1c})$$

i=the transmission ratio between the electric machine and the combustion engine in the planetary gear,
 $J_3$=The moment of inertia of the electric machine,
 $J_1$=The moment of inertia of the combustion engine,
 $T_{el}$=The estimated moment of the electric machine,
 $T_{1c}$=The calculated moment of the combustion engine,
 $dw_{el}/dt$=The time derivative of the angular velocity of the electric machine and
 $dw_1/dt$=The time derivative of the angular velocity of the combustion engine.

$J_3$ and $J_1$ are known quantities while $dw_{el/dt}$ and $dw_{1/dt}$ denote the acceleration of the electric motor 9 and the combustion engine 2, respectively, and can be determined as the difference in rotation speed for the respective components per time unit between two points in time. The moment $T_{1c}$ of the combustion engine 2 can be calculated since the other parameters in the correlation are known.

$T_1$ is thus the moment which the control unit 18 has demanded that the combustion engine 2 is to supply for driving the vehicle 1. $T_{1c}$ constitutes a calculated estimate of the real moment which the combustion engine supplies when driving the vehicle 1. The calculated moment $T_{1c}$ thus corresponds to the real moment with high accuracy. The error between the demanded moment $T_1$ of the combustion engine and the real moment can thereby be estimated as a deviation between the demanded moment $T_1$ and the calculated moment $T_{1c}$.

From observations of errors in the above mentioned moment relation, parameters in a correction model may, for example, be estimated;

$$T_{ice}^* = \epsilon_1 T_{ice} + \epsilon_0$$

The parameters $\epsilon_1$ and $\epsilon_0$ are estimated by known techniques, (for example RLS), and saved for later use in the correction of moment from the combustion engine. The improved accuracy of the correction is beneficial during for example motor controlled gear shifts.

FIG. 3 shows a flow chart which describes a method for driving the vehicle 1. The method starts at 30. At first operation occasions $D_1$ of the vehicle when the coupling portions 15a, 12b are not in engagement with each other and the planetary gear is in a non-locked position, it is possible to calculate the moment $T_{1c}$ which the combustion engine supplies. At 31, such a first operation occasion $D_1$ arises. Suitable such first operation occasions $D_1$ are when the vehicle starts with a free planetary gear, when gears are shifted in the vehicle and when the vehicle is driven with a low positive or negative driving moment at the same time as the combustion engine is driven with idle running rotation speed. At 32, the supplied moment $T_{1c}$ of the combustion engine is calculated at at least a demanded moment $T_1$ and at a rotation speed $n_1$ with the help of the moment $T_{el}$ of the electric machine. With advantage a large number of moments $T_{1c}$ are calculated with a considerable spread concerning demanded moment $T_1$ and rotation speed $n_1$ of the combustion engine 2.

At 33, the demanded moment $T_1$ is compared with the calculated $T_{1c}$. In many cases there is here a deviation since the combustion engine 2 does not always deliver a demanded moment $T_1$ with high accuracy. Information concerning the deviation between the demanded moment $T_1$ and the calculated moment $T_{1c}$ is thus with advantage determined at different moments $T_1$ and rotation speeds $n_1$ of the combustion engine 2. At 34, a correction model is created and a correction factor K is calculated which defines how the deviation varies with the moment $T_1$ and rotation speed $n_1$ of the combustion engine. Such a correction factor K can be determined according to a suitable mathematical method such as the method of least squares. Here the method can start again, at 31, if a new suitable first operation occasion D1 of the vehicle arises at which it is suitable in order to calculate the supplied moment $T_{1c}$ of the combustion engine 2 in order to supplement or update the correction model and the correction factor K. Otherwise the method continues, at 35, when a second operation occasion $D_2$ arises at which the combustion engine 2 is to deliver a demanded moment $T_1$ with a high accuracy. Such a second operation occasion $D_2$ can be when a momentless state is to be created in the gear box 3 for the disengagement of a gear. Another such second operation occasion $D_2$ may be when a momentless state is to be created between the sun wheel 10 and the planet holder 12 for disengagement of the coupling member 15.

At 36, with the help of the demanded moment $T_1$ and the correction factor K, the amount of fuel I is determined which is to be injected into the combustion engine 2 in order for the demanded moment $T_1$ to be obtained with a high accuracy. With the help of such a correction model, the control unit 18 can control the injection member 22 such that it injects an amount of fuel such that the combustion engine 2 provides the demanded moment $T_1$ with a high accuracy. The method thereafter continues at 35 at the next second operation occasion $D_2$ which arises during the continued operation of the vehicle. Alternatively, the method continues at 31 when a new first operation occasion $D_1$ arises at which it is suitable for calculating the supplied moment $T_{1c}$ of the combustion engine 2 in order to supplement or update the correction model and the correction factor K. Since the combustion engine 2 can operate certain assemblies in the vehicle intermittently or with a varying power, it is important that the correction factor is updated relatively frequently. In the above mentioned method, the correction factor K is used only at operation occasions when the combustion engine 2 must provide a demanded moment $T_1$ with a high accuracy. It is however possible to use the correction factor at all operation occasions.

The invention is in no way limited to the embodiment described on the drawings but can be varied freely within the scope of the claims. For example, a transmission with a gear ratio can be arranged between the rotor 9 and the ring wheel 11. The rotor 9 and the ring wheel 11 thus need not rotate with the same rotation speed.

The invention claimed is:

1. A drive system for a vehicle, wherein the drive system comprises a combustion engine with an output shaft, a gear box with an input shaft, an electric machine which comprises a stator and a rotor, and a planetary gear which comprises a sun wheel, a ring wheel and a planet wheel holder,
    wherein the output shaft of the combustion engine is connected to a first of the components of the planetary gear such that rotation of the output shaft leads to rotation of the first component, the input shaft of the gear box is connected to a second of the components of the planetary gear such that rotation of the input shaft leads to rotation of the second component, and the rotor of the electric machine is connected to a third of the components of the planetary gear such that rotation of the rotor leads to rotation of the third component;
    the drive system comprises a control unit which has access to information concerning the moment of the electric machine for driving the vehicle based on knowledge of the electric energy led to or from the electric machine, and the control unit calculates the moment of the combustion engine for driving the vehicle at at least a first operation occasion when there is a known relation between the moment of the electric machine and the moment of the combustion engine based on knowledge of the moment of the electric machine,
    wherein the control unit is configured to compare the calculated moment of the combustion engine with a demanded moment of the combustion engine at the first operation occasion, and
    wherein the control unit is configured to store information concerning a deviation between the calculated moment of the combustion engine and the demanded moment of the combustion engine at the first operation occasion and to use the stored information for controlling the combustion engine at a second operation occasion.

2. A drive system according to claim 1, further comprising the control unit is configured to store information concerning the deviation between the calculated moment of the combustion engine and the demanded moment of the combustion engine at different operation states of the combustion engine.

3. A drive system according to claim 2, further comprising the control unit is configured to supplement and/or update the stored information concerning the deviation between the calculated moment of the combustion engine and the demanded moment of the combustion engine during subsequent first operation occasions.

4. A drive system according to claim 1, further comprising the control unit is configured to use the calculated moment of the combustion engine for controlling the combustion engine at second operation occasions when the combustion engine supplies the demanded moment.

5. A drive system according to claim 4, further comprising the control unit is configured to use the calculated moment of the combustion engine for controlling the combustion engine at second operation occasions.

6. A drive system according to claim 1, further comprising the planetary gear comprises a coupling member configured to lock the output shaft of the combustion engine and the input shaft of the gear box in relation to each other and the control unit is configured to determine the calculated moment of the combustion engine at first operation occasions when the coupling member is in a non-locked position in which the output and input shafts are rotatable with different rotation speeds.

7. A drive system according to claim 1, further comprising the control unit is configured to determine the calculated moment of the combustion engine with assistance from a correlation which comprises the transmission ratio between the output shaft of the combustion engine and the electric machine in the planetary gear, the moment of inertia of the electric machine, the moment of inertia of the combustion engine, the acceleration of the electric machine, and the acceleration of the combustion engine.

8. A drive system according to claim 1, further comprising the output shaft of the combustion engine is connected to the sun wheel of the planetary gear, the input shaft of the gear box is connected to the planet wheel holder of the planetary gear and the rotor of the electric machine is connected to the ring wheel of the planetary gear.

9. Vehicle comprising a drive system according to claim 1.

10. A method of driving a vehicle, wherein the vehicle comprises a control unit, a combustion engine with an output shaft, a gear box with an input shaft, an electric machine which comprises a stator and a rotor, and a planetary gear which comprises a sun wheel, a ring wheel and a planet wheel holder,
    wherein the output shaft of the combustion engine is connected to a first of the components of the planetary gear such that rotation of the output shaft leads to rotation of the first component, the input shaft of the gear box is connected to a second of the components of the planetary gear such that rotation of the input shaft leads to rotation of the second component and the rotor of the electric machine is connected to a third of the components of the planetary gear such that rotation of the rotor leads to rotation of the third component;
    the method comprising the steps of providing to the control unit access to information concerning the moment of the electric machine for driving the vehicle based on gaining knowledge of the electric energy led to or from the electric machine, calculating with the control unit the moment of the combustion engine for driving the vehicle at at least a first operation occasion when there is a known relation between the moment of the electric machine and the moment of the combustion engine based on knowledge of the moment of the electric machine, comparing the calculated moment of the combustion engine with a demanded moment of the combustion engine at the first operation occasion, storing information concerning the deviation between the calculated moment of the combustion engine and the demanded moment of the combustion engine at the first operation occasion, and using the stored information for controlling the combustion engine at a second operation occasion.

11. A method according to claim 10, further comprising storing information concerning the deviation between the calculated moment of the combustion engine and the demanded moment of the combustion engine at different operation occasions of the combustion engine.

12. A method according to claim 10, further comprising supplementing and/or updating the stored information concerning the deviation between the calculated moment of the combustion engine and the demanded moment of the combustion engine during subsequent first operation occasions.

13. A method according to claim 10, further comprising using the calculated moment of the combustion engine for controlling the combustion engine at second operation occasions when the combustion engine is to supply the demanded moment.

14. A method according to claim 13, further comprising using the calculated moment of the combustion engine for controlling the combustion engine at second operation occasions.

15. A method according to claim 10, further comprising locking the output shaft of the combustion engine and the input shaft of the gear box in relation to each other with a coupling member and determining the calculated moment of the combustion engine at first operation occasions when the coupling member is in a non-locked position in which the output and input shafts are rotatable with different rotation speeds.

16. A method according to claim 10, further comprising determining the calculated moment of the combustion engine with help of a correlation which comprises the transmission ratio between the output shaft of the combustion engine and the electric machine in the planetary gear, the moment of inertia of the electric machine, the moment of inertia of the combustion engine, the acceleration of the electric machine, and the acceleration of the combustion engine.

17. A method according to claim 10, further comprising connecting the output shaft of the combustion engine to the sun wheel of the planetary gear, connecting the input shaft of the gear box to the planet wheel holder of the planetary gear and connecting the rotor of the electric machine to the ring wheel of the planetary gear.

18. A non-transitory computer program product comprising a non-volatile data storage medium on which computer code is stored and which is readable by a computer, wherein the computer program code of the computer program product causes a computer to implement a method when the computer program code is executed in the computer, the method comprising driving a vehicle, wherein the vehicle comprises a control unit, a combustion engine with an output shaft, a gear box with an input shaft, an electric machine which comprises a stator and a rotor, and a planetary gear which comprises a sun wheel, a ring wheel and a planet wheel holder, wherein the output shaft of the combustion engine is connected to a first of the components of the planetary gear such that rotation of the output shaft leads to rotation of the first component, the input shaft of the gear box is connected to a second of the components of the planetary gear such that rotation of the input shaft leads to rotation of the second component and the rotor of the electric machine is connected to a third of the components of the planetary gear such that rotation of the rotor leads to rotation of the third component;

the method comprising the steps of providing to the control unit access to information concerning the moment of the electric machine for driving the vehicle based on gaining knowledge of the electric energy led to or from the electric machine, calculating with the control unit the moment of the combustion engine for driving the vehicle at at least a first operation occasion when there is a known relation between the moment of the electric machine and the moment of the combustion engine based on knowledge of the moment of the electric machine, comparing the calculated moment of the combustion engine with a demanded moment of the combustion engine at the first operation occasion, storing information concerning the deviation between the calculated moment of the combustion engine and the demanded moment of the combustion engine at the first operation occasion, and using the stored information for controlling the combustion engine at a second operation occasion.

\* \* \* \* \*